US008875295B2

(12) United States Patent
Lutas et al.

(10) Patent No.: US 8,875,295 B2
(45) Date of Patent: Oct. 28, 2014

(54) MEMORY INTROSPECTION ENGINE FOR INTEGRITY PROTECTION OF VIRTUAL MACHINES

(71) Applicant: Bitdefender IPR Management Ltd., Nicosia (CY)

(72) Inventors: Andrei V. Lutas, Satu Mare (RO); Sandor Lukacs, Floresti (RO); Dan H. Lutas, Cluj-Napoca (RO)

(73) Assignee: Bitdefender IPR Management Ltd., Nicosia (CY)

( * ) Notice: Subject to any disclaimer, the term of this patent is extended or adjusted under 35 U.S.C. 154(b) by 153 days.

(21) Appl. No.: 13/774,720

(22) Filed: Feb. 22, 2013

(65) Prior Publication Data

US 2014/0245444 A1   Aug. 28, 2014

(51) Int. Cl.
*G06F 11/00* (2006.01)
*G06F 12/14* (2006.01)
*G06F 12/16* (2006.01)
*G08B 23/00* (2006.01)
*G06F 11/30* (2006.01)
*H04L 29/06* (2006.01)
*G06F 21/56* (2013.01)
*G06F 12/10* (2006.01)
*G06F 9/455* (2006.01)
*G06F 21/53* (2013.01)
*G06F 21/62* (2013.01)

(52) U.S. Cl.
CPC .......... *H04L 63/1441* (2013.01); *G06F 21/562* (2013.01); *G06F 21/56* (2013.01); *G06F 21/566* (2013.01); *G06F 12/109* (2013.01); *G06F 12/1466* (2013.01); *G06F 12/1491* (2013.01); *G06F 9/455* (2013.01); *G06F 21/53* (2013.01); *G06F 21/6227* (2013.01)

USPC .............................................. 726/24; 713/188

(58) Field of Classification Search
CPC ... H04L 63/1441; H04L 63/145; G06F 21/56; G06F 21/562; G06F 21/566
USPC .............................................. 726/24; 713/188
See application file for complete search history.

(56) References Cited

U.S. PATENT DOCUMENTS

| 6,851,057 | B1 * | 2/2005 | Nachenberg ................... 726/24 |
| 7,487,314 | B1 | 2/2009 | Agesen et al. |
| 7,657,695 | B1 | 2/2010 | Wheeler |

(Continued)

OTHER PUBLICATIONS

European Patent Office, International Search Report and Written Opinion of the International Searching Authority Mailed Jul. 1, 2014 for PCT International Application No. PCT/RO2014/000006, filed Feb. 4, 2014.

*Primary Examiner* — Carolyn B Kosowski
(74) *Attorney, Agent, or Firm* — Law Office of Andrei D Popovici, PC (57) ABSTRACT

Described systems and methods allow protecting a computer system from malware, such as viruses and rootkits. In some embodiments, a hypervisor configures a hardware virtualization platform hosting a set of operating systems (OS). A memory introspection engine executing at the processor privilege level of the hypervisor dynamically identifies each OS, and uses an protection priming module to change the way memory is allocated to a target software object by the memory allocation function native to the respective OS. In some embodiments, the change affects only target objects requiring malware protection, and comprises enforcing that memory pages containing data of the target object are reserved exclusively for the respective object. The memory introspection engine then write-protects the respective memory pages.

29 Claims, 6 Drawing Sheets

(56) References Cited

U.S. PATENT DOCUMENTS

| | | |
|---|---|---|
| 7,822,941 B2 | 10/2010 | Vick et al. |
| 7,836,504 B2 * | 11/2010 | Ray et al. .................. 726/24 |
| 8,104,089 B1 * | 1/2012 | Guo et al. .................. 726/24 |
| 8,209,510 B1 | 6/2012 | Thathapudi et al. |
| 8,307,169 B2 | 11/2012 | Elteto |
| 8,327,059 B2 | 12/2012 | Chen et al. |
| 8,397,242 B1 * | 3/2013 | Conover .................. 719/313 |
| 8,474,039 B2 * | 6/2013 | Sallam .................. 726/22 |
| 8,510,828 B1 * | 8/2013 | Guo et al. .................. 726/22 |
| 8,656,482 B1 * | 2/2014 | Tosa et al. .................. 726/15 |
| 8,838,913 B1 * | 9/2014 | Conover .................. 711/154 |
| 8,839,237 B2 * | 9/2014 | Sahita et al. .................. 718/1 |
| 2003/0018869 A1 * | 1/2003 | Hou .................. 711/170 |
| 2006/0200863 A1 * | 9/2006 | Ray et al. .................. 726/24 |
| 2007/0055837 A1 | 3/2007 | Rajagopal et al. |
| 2007/0067590 A1 * | 3/2007 | Savagaonkar et al. ........ 711/163 |
| 2008/0016570 A1 * | 1/2008 | Capalik .................. 726/23 |
| 2008/0320594 A1 * | 12/2008 | Jiang .................. 726/24 |
| 2009/0222923 A1 * | 9/2009 | Dixon .................. 726/24 |
| 2009/0307705 A1 | 12/2009 | Bogner |
| 2010/0082926 A1 * | 4/2010 | Sahita et al. .................. 711/163 |
| 2010/0306849 A1 * | 12/2010 | Zheng et al. .................. 726/24 |
| 2012/0216187 A1 * | 8/2012 | Ben-Yehuda et al. ............ 718/1 |
| 2012/0240224 A1 * | 9/2012 | Payne et al. .................. 726/21 |
| 2012/0254864 A1 | 10/2012 | Bork et al. |
| 2012/0254993 A1 | 10/2012 | Sallam |
| 2012/0331465 A1 | 12/2012 | Tanikawa |
| 2013/0179971 A1 * | 7/2013 | Harrison .................. 726/23 |
| 2014/0053272 A1 * | 2/2014 | Lukacs et al. .................. 726/24 |
| 2014/0068341 A1 * | 3/2014 | Martineau et al. ......... 714/38.11 |
| 2014/0137180 A1 * | 5/2014 | Lukacs et al. .................. 726/1 |
| 2014/0189687 A1 * | 7/2014 | Jung et al. .................. 718/1 |
| 2014/0189882 A1 * | 7/2014 | Jung et al. .................. 726/27 |
| 2014/0259169 A1 * | 9/2014 | Harrison .................. 726/23 |

* cited by examiner

MEMORY INTROSPECTION ENGINE FOR INTEGRITY PROTECTION OF VIRTUAL MACHINES

BACKGROUND

The invention relates to systems and methods for protecting computer systems from malware, and in particular to anti-malware systems employing hardware virtualization technology.

Malicious software, also known as malware, affects a great number of computer systems worldwide. In its many forms such as computer viruses, worms, and rootkits, malware presents a serious risk to millions of computer users, making them vulnerable to loss of data and sensitive information, identity theft, and loss of productivity, among others.

Hardware virtualization technology allows the creation of simulated computer environments commonly known as virtual machines, which behave in many ways as physical computer systems. In typical applications such as server consolidation and infrastructure-as-a-service (IAAS), several virtual machines may run simultaneously on the same physical machine, sharing the hardware resources among them, thus reducing investment and operating costs. Each virtual machine may run its own operating system and/or software applications, separately from other virtual machines. Due to the steady proliferation of malware, each virtual machine operating in such an environment potentially requires malware protection.

A virtualization solution commonly used in the art comprises a hypervisor, also known as a virtual machine monitor, consisting of a layer of software operating between the computing hardware and the operating system (OS) of a virtual machine, and having more processor privileges than the respective OS. Anti-malware operations may be conducted at the privilege level of the hypervisor. Although such configurations may facilitate malware detection and prevention, they introduce an extra layer of complexity and may carry significant computational costs.

There is considerable interest in developing anti-malware solutions for hardware virtualization platforms, solutions which are robust and scalable, with minimum computing overhead.

SUMMARY

According to one aspect, a host system comprises at least one processor configured to execute an operating system and a protection priming module. The operating system is configured to allocate a section of a virtualized physical memory of a virtual machine to a target software object executing within the virtual machine, the virtual machine exposed by a hypervisor executing on the host system. The virtualized physical memory is partitioned into pages, a page being the smallest unit of memory individually mapped between the virtualized physical memory and a physical memory of the host system. The protection priming module is configured, in response to a determination of whether the target software object satisfies a selection criterion for malware protection, when the target software object satisfies the selection criterion, to change a memory allocation of the target object, wherein changing the memory allocation comprises ensuring that any page containing at least part of the target software object is reserved for the target software object.

According to another aspect, a method comprises employing at least one processor of a host system to form an operating system configured to allocate a section of a virtualized physical memory of a virtual machine to a target software object executing within the virtual machine, the virtual machine exposed by a hypervisor executing on the host system. The virtualized physical memory is partitioned into pages, a page being the smallest unit of memory individually mapped between the virtualized physical memory and a physical memory of the host system. The method further comprises, in response to a determination of whether the target software object satisfies a selection criterion for malware protection, when the target software object satisfies the selection criterion, employing the at least one processor to change a memory allocation of the target software object, wherein changing the memory allocation comprises ensuring that any page containing at least part of the target software object is reserved for the target software object.

According to another aspect, a non-transitory computer-readable medium encodes instructions which, when executed by at least one processor of a host system, cause the at least one processor to allocate a section of a virtualized physical memory of a virtual machine to a target software object executing within the virtual machine, the virtual machine exposed by a hypervisor executing on the host system. The virtualized physical memory is partitioned into pages, a page being the smallest unit of memory individually mapped between the virtualized physical memory and a physical memory of the host system. The instructions further cause the at least one processor to change a memory allocation of the target software object in response to a determination of whether the target software object satisfies a selection criterion for malware protection. The change in memory allocation is performed when the target software object satisfies the selection criterion. Changing the memory allocation comprises ensuring that any page containing at least part of the target software object is reserved for the target software object.

BRIEF DESCRIPTION OF THE DRAWINGS

The foregoing aspects and advantages of the present invention will become better understood upon reading the following detailed description and upon reference to the drawings where.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Unless otherwise specified, a page represents the smallest unit of virtualized physical memory individually mapped to a physical memory of a host system. Unless otherwise specified, a section of virtualized physical memory is said to span a set of pages when each page of the set of pages contains a part of the respective section. Reserving a page for a target object encompasses allocating the whole page to the target object, and otherwise ensuring that the respective page does not host parts of objects distinct from the target object. Computer readable media encompass non-transitory media such as magnetic, optic, and semiconductor storage media (e.g. hard drives, optical disks, flash memory, DRAM), as well as communications links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
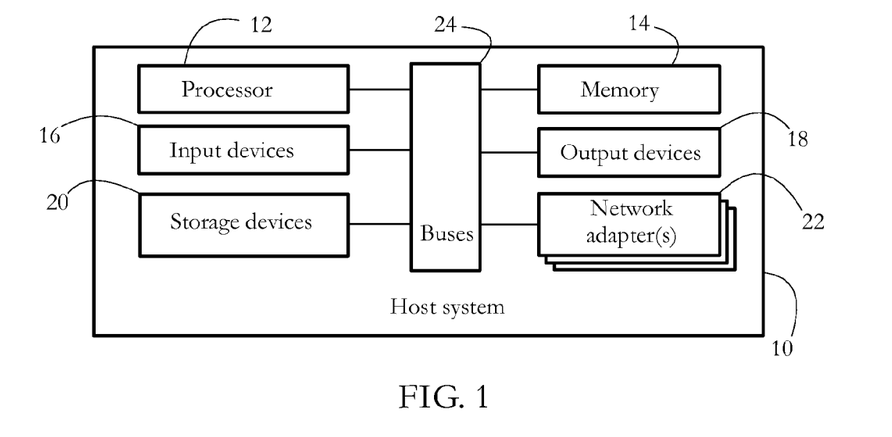
FIG. 1 shows an exemplary hardware configuration of a host computer system protected from malware according to some embodiments of the present invention.

FIG. 1 shows an exemplary hardware configuration of a host system 10 according to some embodiments of the present invention. Host system 10 may represent a corporate computing device such as an enterprise server, or an end-user device such as a personal computer or a smartphone, among others. Other host systems include entertainment devices such as TVs and game consoles, or any other device having a memory and a processor supporting virtualization, and requiring malware protection. FIG. 1 shows a computer system for illustrative purposes; other client devices such as mobile telephones or tablets may have a different configuration. In some embodiments, system 10 comprises a set of physical devices, including a processor 12, a memory unit 14, a set of input devices 16, a set of output devices 18, a set of storage devices 20, and a set of network adapters 22, all connected by a set of buses 24.

In some embodiments, processor 12 comprises a physical device (e.g. multi-core integrated circuit) configured to execute computational and/or logical operations with a set of signals and/or data. In some embodiments, such logical operations are delivered to processor 12 in the form of a sequence of processor instructions (e.g. machine code or other type of software). Memory unit 14 may comprise volatile computer-readable media (e.g. RAM) storing data/signals accessed or generated by processor 12 in the course of carrying out instructions. Input devices 16 may include computer keyboards, mice, and microphones, among others, including the respective hardware interfaces and/or adapters allowing a user to introduce data and/or instructions into system 10. Output devices 18 may include display devices such as monitors and speakers among others, as well as hardware interfaces/adapters such as graphic cards, allowing system 10 to communicate data to a user. In some embodiments, input devices 16 and output devices 18 may share a common piece of hardware, as in the case of touch-screen devices. Storage devices 20 include computer-readable media enabling the non-volatile storage, reading, and writing of software instructions and/or data. Exemplary storage devices 20 include magnetic and optical disks and flash memory devices, as well as removable media such as CD and/or DVD disks and drives. The set of network adapters 22 enables system 10 to connect to a computer network and/or to other devices/computer systems. Buses 24 collectively represent the plurality of system, peripheral, and chipset buses, and/or all other circuitry enabling the inter-communication of devices 12-22 of host system 10. For example, buses 24 may comprise the northbridge connecting processor 12 to memory 14, and/or the southbridge connecting processor 12 to devices 16-22, among others.

Figure 2:
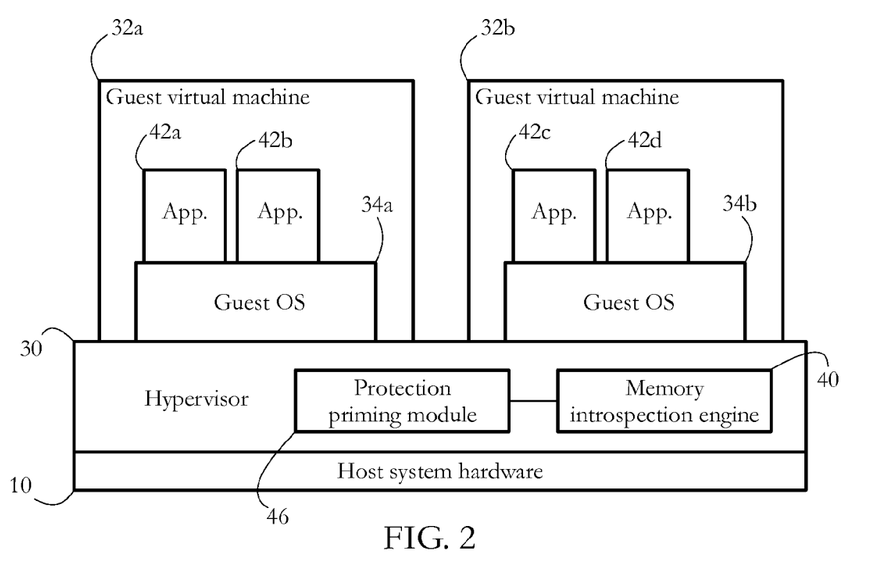
FIG. 2 shows an exemplary set of virtual machines exposed by a hypervisor executing on the host system of FIG. 1 according to some embodiments of the present invention.

FIG. 2 shows an exemplary set of guest virtual machines 32a-b executing on host system 10 and exposed by a hypervisor 30 according to some embodiments of the present invention. Virtual machines (VM) are commonly known in the art as software emulations of actual physical machines/computer systems, each capable of running its own operating system and software independently of other VMs. Hypervisor 30 comprises software allowing the multiplexing (sharing) by multiple virtual machines of hardware resources of host system 10, such as processor operations, memory, storage, input/output, and networking devices. In some embodiments, hypervisor 30 enables multiple virtual machines and/or operating systems (OS) to run concurrently on host system 10, with various degrees of isolation. To enable such configurations, software forming part of hypervisor 30 may create a plurality of virtualized, i.e., software-emulated devices, each virtualized device emulating a physical hardware device of system 10, such as processor 12 and memory 14, among others. Hypervisor 30 may further assign a set of virtual devices to each VM operating on host system 10. Thus, each VM 32a-b operates as if it possesses its own set of physical devices, i.e., as a more or less complete computer system. Examples of popular hypervisors include the VMware vSphere™ from VMware Inc. and the open-source Xen hypervisor, among others.

In some embodiments, hypervisor 30 includes a memory introspection engine 40, configured to perform anti-malware operations as described further below, and a protection priming module 46 connected to memory introspection engine 40. Engine 40 and module 46 may be incorporated into hypervisor 30, or may be delivered as software components distinct and independent from hypervisor 30, but executing at substantially the same processor privilege level as hypervisor 30. A single engine 40 may be configured to malware-protect multiple VMs executing on host system 10.

While FIG. 2 shows just two VMs 32a-b for simplicity, host system 10 may operate a large number, e.g. hundreds, of VMs, and the number of such VMs may change during the operation of host system 10. In some embodiments, each VM 32a-b executes a guest operating system 34a-b and/or a set of software applications 42a-b and 42c-d, respectively, concurrently and independently of other VMs running on host system 10. Each OS 34a-b comprises software that provides an interface to the (virtualized) hardware of the respective VM 32a-b, and acts as a host for computing applications 42a-b and 42c-d, respectively, running on the respective OS. Operating systems 34a-b may comprise any widely available operating system such as Windows®, MacOS®, Linux®, iOS®, or Android™, among others. Applications 42a-d may include word processing, image processing, database, browser, electronic communication applications, and anti-malware applications, among others.

Figure 3:
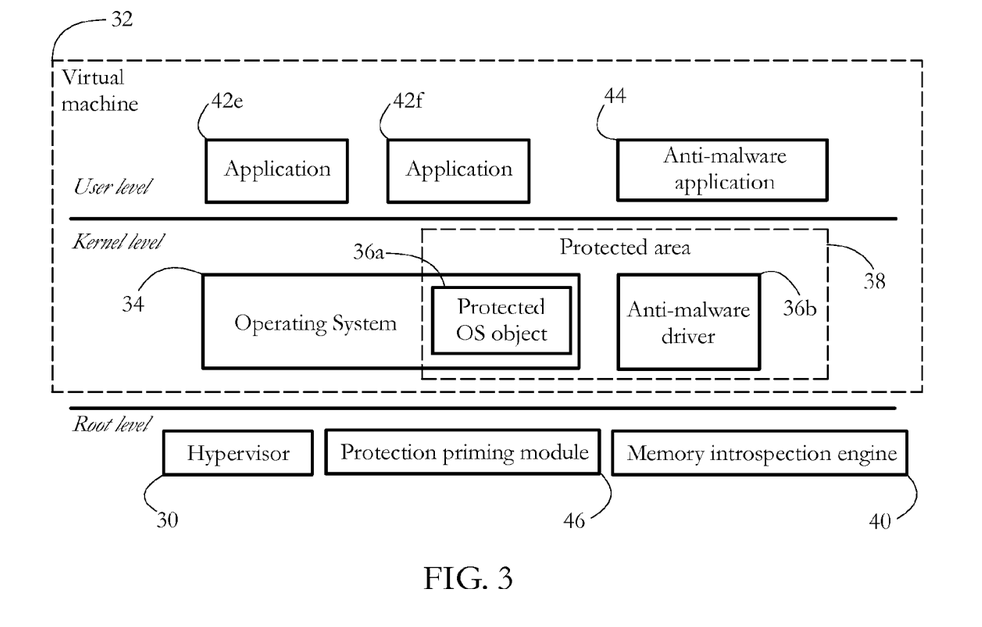
FIG. 3 illustrates an exemplary hierarchy of software objects executing on the host system at various processor privilege levels, including a set of objects protected from malware according to some embodiments of the present invention.

FIG. 3 illustrates a hierarchy of software objects executing on host system 10 according to some embodiments of the present invention. FIG. 3 is represented from the perspective of processor privilege levels, also known in the art as layers or protection rings. In some embodiments, hypervisor 30 takes control of processor 12 at the most privileged level (typically known as root mode, or as VMXroot on Intel platforms), thus creating a hardware virtualization platform presented as a virtual machine 32 to other software executing on host system 10. An operating system 34, such as OS 34a-b in FIG. 2, executes within the virtual environment of VM 32, OS 34 having processor privileges (e.g., kernel mode or ring 0 on Intel platforms) lower than hypervisor 30. OS 34 may further include a protected OS object 36a, executing at OS privilege level. In some embodiments, protected OS object 36a comprises a data structure selected for malware protection, such as a driver object, as shown further below. A set of applications 42e-f, such as applications 42a-d of FIG. 2, execute at a processor privilege level (e.g., user mode on Intel platforms) lower than the privilege level of OS 34.

In some embodiments, an anti-malware application 44 executes on OS 34, typically at the same processor privilege level as applications 42e-f. Exemplary anti-malware applications 44 include anti-virus programs or larger software suites comprising anti-virus, anti-spyware and other computer security applications. In some embodiments, an anti-malware driver 36b executes at a processor level similar to that of OS 34. Driver 36b provides functionality to anti-malware application 44, e.g. to scan memory for malware signatures and/or to detect malware-indicative behavior of software objects executing on OS 34.

In some embodiments, introspection engine 40 executes substantially at the same privilege level as hypervisor 30, and is configured to perform introspection of virtual machines such as VM 32. Introspection of a VM, or of a software object executing on the respective VM, may comprise analyzing a behavior of the software object, determining and/or accessing memory addresses of such software objects, restricting access of certain processes to a content of memory located at such addresses, and analyzing such content, among others. In some embodiments, software objects targeted by introspection engine 40 comprise processes, instruction streams, registers, and data structures such as page tables and driver objects, among others.

In an exemplary operation, memory introspection engine 40 may set up a protected area 38 consisting of software objects protected from malware. Protecting such objects may comprise restricting access to a memory region storing data belonging to the respective objects. Since hypervisor 30 has control over the memory space of VM 32, protecting certain regions of memory used by OS 34 may be achieved e.g. by hypervisor 30 setting appropriate access rights to the respective memory regions. In some embodiments, protected area 38 includes protected OS object 36a and anti-malware driver 36b. When OS 34 is a Linux operating system, exemplary protected OS objects 36a include: the kernel (read-only code and/or data such as sys_call_table), sysenter/syscall control registers, and addresses int 0x80 (syscall) and/or int 0x01, among others. Exemplary protected objects of a Windows OS include: the kernel (read-only code and/or data, including the System Service Dispatch Table), various descriptor tables (e.g., interrupt, general and/or local), sysenter/syscall control registers and/or other registers such as an interrupt descriptor table register (IDTR), a global descriptor table register (GDTR), and a local descriptor table register (LDTR). In some embodiments, protected OS object 36a may also comprise specific driver objects and fast I/O dispatch tables (e.g., disk, atapi, clfs, fltmgr, ntfs, fastfat, iastor, iastorv), among others. Other protected OS objects 36a may include certain model specific registers (MSRs), such as ia32_systenter_eip, ia32_sysenter_esp, ia32_efer, ia32_star, ia32_1star, and ia32_gs_base. In some embodiments, introspection engine 40 also protects page tables, to prevent unauthorized rerouting to addresses housing malicious code.

Virtual machines typically operate with a virtualized physical memory, i.e., a virtual representation of the actual physical memory 14 of host system 10. Virtualized physical memory comprises a contiguous space of virtualized addresses, specific to each guest VM 32a-b, with parts of said space mapped to addresses within physical memory 14 and/or physical storage devices 20. In systems configured to support virtualization, such mapping is typically achieved by dedicated data structures controlled by processor 12, such as extended page tables (EPT) or nested page tables (NPT). In such systems, virtualized physical memory may be partitioned in units known in the art as pages, a page representing the smallest unit of virtualized physical memory individually mapped to physical memory via mechanisms such as EPT and/or NPT, i.e., mapping between physical and virtualized physical memory is performed with page granularity. All pages typically have a predetermined size, e.g., 4 kilobytes, 2 megabytes, etc. The partitioning of virtualized physical memory is usually configured by hypervisor 30. In some embodiments, hypervisor 30 also configures the EPT/NPT and therefore the mapping between physical memory and virtualized physical memory. Some hardware configurations allow hypervisor 30 to selectively control access to data stored within each page, e.g., by setting read and write access rights to the respective page. Such rights may be set, for instance, by modifying an entry of the respective page within the EPT or NPT. Hypervisor 30 may thus select which software object may access data stored at the addresses within each page, and may indicate which operations are allowed with the respective data, e.g., read, write, etc. An attempt by a software object to perform an operation, such as reading data from, or writing data to a page to which the object does not have the respective right, may trigger a virtual machine exit event (e.g. a VMExit event on Intel platforms). In some embodiments, virtual machine exit events transfer control of the processor from the VM executing the respective software object to hypervisor 30, thus preventing the unauthorized read/write attempt.

In some embodiments, OS 34 configures a virtual memory space (also termed logical address space) and exposes said virtual memory space to an application such as applications 42e-f and 44 in FIG. 3, and/or to another software object such as protected objects 36a-b. In such systems, OS 34 configures and maintains a mapping between said virtual memory space and the virtualized physical memory of VM 32, for instance using a page table mechanism. In some embodiments, said virtual memory space is also partitioned into pages, such pages representing the smallest unit of virtual memory individually mapped to virtualized physical memory by OS 34 (virtual to virtualized physical memory mapping is performed with page granularity).

Figure 4:
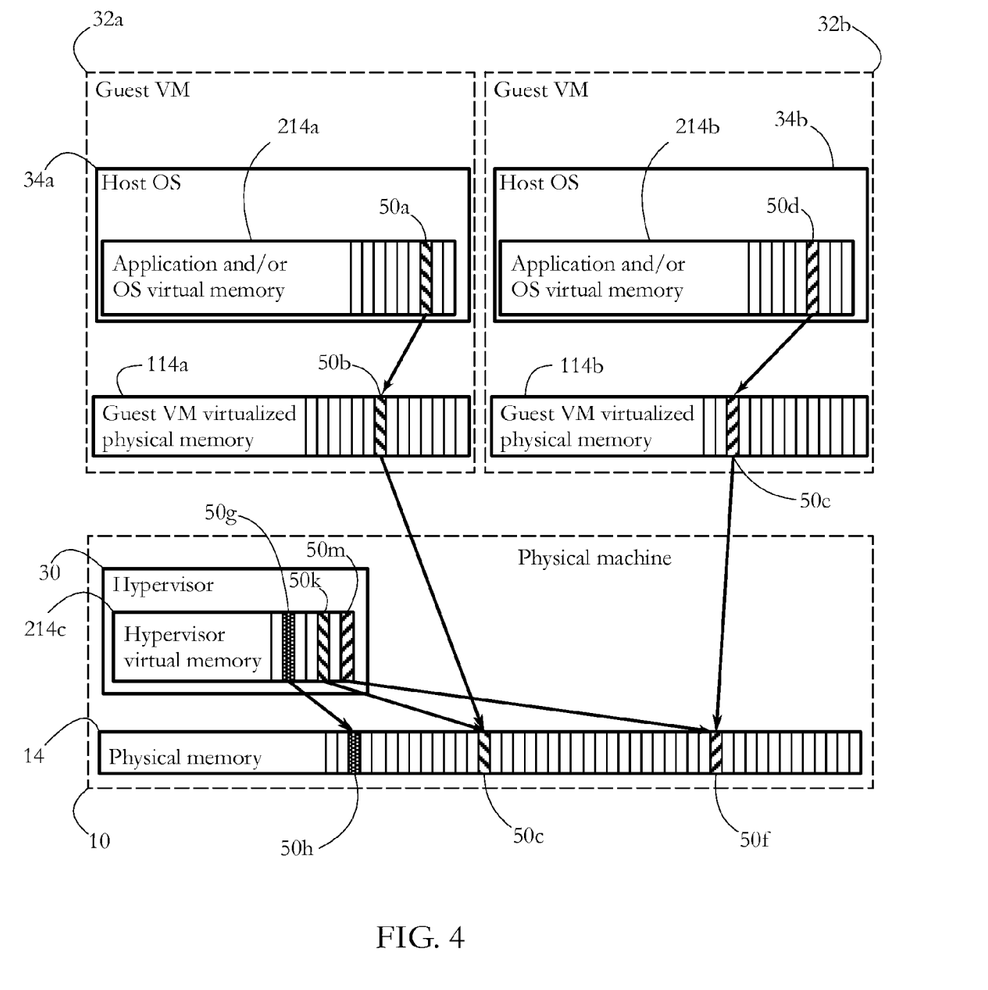
FIG. 4 shows an exemplary mapping of memory addresses in the system configuration of FIG. 2, according to some embodiments of the present invention.

FIG. 4 illustrates an exemplary mapping of memory addresses in an embodiment as shown in FIG. 2. A software object, such as application 42a or guest OS 34a, is assigned a virtual address space 214a by guest OS 34a. When the respective software object attempts to access an exemplary memory address 50a, address 50a is translated by the virtualized processor of guest VM 32a, according to page tables configured and controlled by guest OS 34a, into an address 50b within a virtualized physical memory space 114a of virtual machine 32a. Address 50b is also known in the art as a guest-physical address. Hypervisor 30, which configures and controls virtualized physical memory 114a, then maps address 50b to an address 50c within physical memory 14 of host system 10, for instance using EPT or NPT means, as discussed above.

Similarly, a virtual memory space 214b is set up by guest OS 34b for applications (e.g. 42c) or other software objects executing on guest VM 32b. An exemplary virtual address 50d within space 214b is translated by the virtualized processor of guest VM 32b, according to translation tables configured and controlled by guest OS 34b, into an address 50e within a virtualized physical memory space 114b of guest VM 32b. Address 50e is further mapped by hypervisor 30 into an address 50f within physical memory 14.

In some embodiments, hypervisor 30 sets up its own virtual memory space 214c comprising a representation of physical memory 14, and employs a translation mechanism (for instance, page tables) to map addresses in space 214c into addresses in physical memory 14. In FIG. 4, such an exemplary mapping translates an address 50g into an address 50h. Similarly, addresses such as 50c and 50f in physical memory 14 correspond to addresses 50k and 50m, respectively, within virtual memory space 214c of hypervisor 30.

An essential task of OS 34a-b is to dynamically allocate sections of memory to software objects executing on the respective VM 32a-b, and to free such sections for reuse when they are no longer needed by the respective process. Such memory allocation may be executed at the level of virtual memory 214a-b, or at the level of virtualized physical memory 114a-b of the respective virtual machine. Memory allocation and de-allocation is typically performed by dedicated OS memory management functions, such as KeAllocatePoolWithTag and KeFreePoolWithTag in Windows®.

Figure 5:
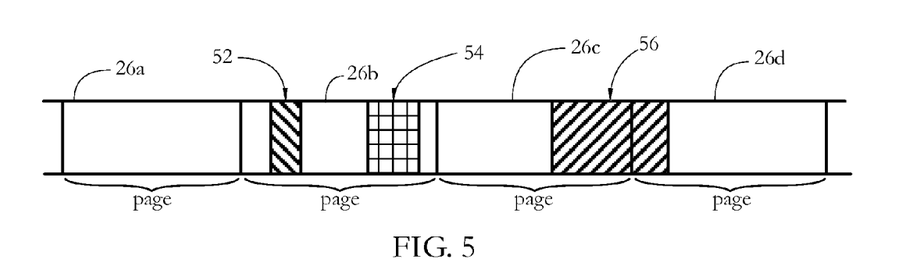
FIG. 5 shows an exemplary memory allocation, wherein a virtualized physical memory space is divided into pages, and wherein a distinct section of memory is allocated to each of a plurality of software objects.

Due to memory mapping mechanisms discussed before, memory allocation for a target object always results in allocation of a section of virtualized physical memory of the respective VM to the target object. The size of the respective section may be only a fraction of a page, or more than one page, according to page size and to the memory requirements of the respective software object. In the following, a section is said to span a set of pages when each page of the set of pages contains a part of the respective section. Several objects may be allocated distinct sections of the same page. FIG. 5 shows an exemplary region of virtualized physical memory divided into a plurality of pages 26a-d, and an exemplary memory allocation, wherein two sections 52 and 54, each allocated to a distinct software object, span the same page 26b. Another exemplary section 56 spans two pages 26c-d.

Figure 6:
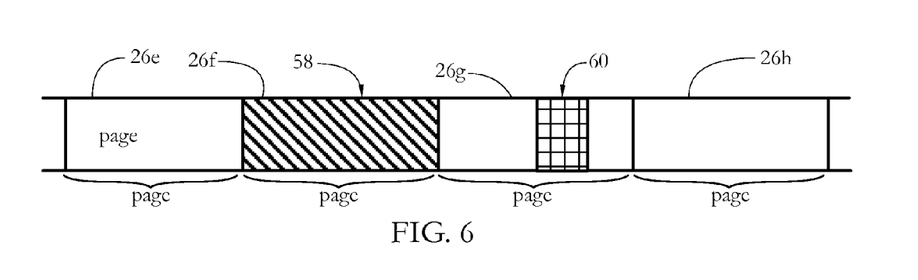
FIG. 6 illustrates an exemplary memory allocation, wherein a page is allocated exclusively to a protected software object according to some embodiments of the present invention.

In contrast, FIG. 6 shows an exemplary memory allocation according to some embodiments of the present invention. As shown in detail below, when a target object requires malware protection, e.g., when the target object is a driver object or another object belonging to protected area 38, some embodiments of protection priming module 46 modify the memory allocation for the target object, so that each page containing a part of the target object is reserved for the target object.

A person skilled in the art will appreciate that reserving a set of pages for a target object may be achieved in several ways. In some embodiments, reserving a page comprises allocating the entire page to the target object, as shown in the example of FIG. 6, wherein section 58 occupies the entire page 26f. Such exclusive allocation may be achieved, for instance, by changing the size of the section allocated to the respective object to a new size equal to an integer multiple of page size, as shown in more detail below. In contrast, in the same example of FIG. 6, an unprotected software object is allocated a section 60 consisting of just a fraction of another page 26g. In other embodiments, reserving a set of pages for the target object does not necessarily include modifying the size of the target object or allocating the entire set of pages to the target object, but may be achieved by otherwise ensuring that no object except the target object is allocated memory space within the respective set of pages. For instance, reserving a page for the target object may comprise setting aside a set of empty pages, e.g. upon initialization of OS 34, and allocating (or moving) the object to within the respective set of empty pages, as shown in more detail below.

Figure 7:
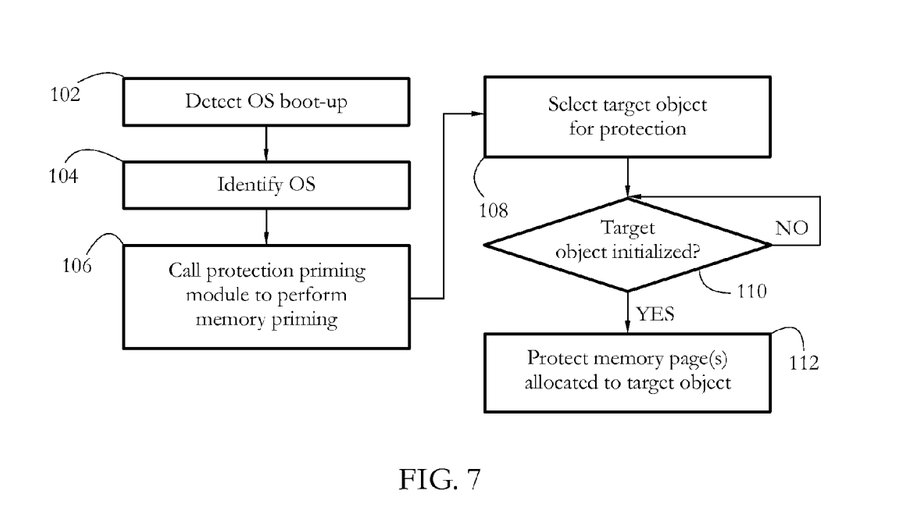
FIG. 7 shows an exemplary sequence of steps performed by the memory introspection engine to protect a virtual machine according to some embodiments of the present invention.

FIG. 7 shows an exemplary sequence of steps performed by memory introspection engine 40 according to some embodiments of the present invention. Engine 40 may be configured to inspect and/or protect a plurality of virtual machines executing concurrently on host system 10. The steps illustrated in FIG. 7 may be repeated for each such virtual machine. In a step 102, engine 40 detects an initialization of OS 34. In some embodiments, step 102 comprises listening, from the level of hypervisor 30, for processor events indicative of OS initialization. Processor instructions that perform OS initialization operations typically require kernel processor privilege, e.g., ring 0 on Intel platforms. When executed from the privilege level of OS 34, such instructions may trigger a virtual machine exit event, such as a VMExit event on Intel platforms, which transfers control of processor 12 from OS 34 to hypervisor 30. Virtual machine exit events may therefore be analyzed by hypervisor 30 and/or introspection engine 40. Examples of events and/or processor instructions indicative of OS initialization comprise the initialization of the interrupt and global descriptor table, which are done early in the initialization of the Windows OS, by using privileged instructions such as LIDT and/or LGDT. Other examples of events/instructions indicative of OS initialization include writing to the SYSENTER and/or SYSCALL model-specific registers, by using the WRMSR machine instruction, which is done immediately after the kernel image of the OS has been loaded in memory. Yet other examples comprise initialization of other model-specific registers programmed by OS 34, such as the machine-check configuration registers, and FS/GS base registers, among others. In some embodiments, detecting such events/instructions indicates that OS 34 has been initialized.

In a step 104, some embodiments of memory introspection engine 40 identify a type of operating system currently executing or being initialized on the respective guest VM.

Exemplary OS types include Windows, Linux, MacOS, and Android, among others. OS type may comprise a name indicator, such as Windows, and a version indicator, such as 7, Home, or Enterprise, among others. In some embodiments, step 104 comprises identifying the type of OS according to a content of a model-specific register (MSR) of the respective guest VM, or to a content of a section of memory pointed to by the respective MSR. In some embodiments, engine 40 may determine the name of OS according to data being written to such MSRs by instructions intercepted in step 102. For instance, engine 40 may intercept instructions to write to a SYSENTER or to a SYSCALL MSR, and determine the type of OS currently executing, or currently initializing, according to a parameter of such a write instruction. Other exemplary registers, which may provide information about the OS name include control registers, interrupt descriptor table (IDT), and global descriptor table (GDT), among others. For identifying OS type according to MSR writes, introspection engine 40 may further use pattern matching against a pre-determined library of fast system-call handlers specific to each OS (e.g., system calls handled according to a content of the SYSCALL or SYSENTER MSRs). Such fast system-call libraries may be provided with memory introspection engine 40, and may be kept up to date via periodic or on-demand software updates.

In some embodiments, a version indicator (such as a release name, build number, etc.) may be obtained by parsing certain kernel data structures specific to the respective type of OS. Exemplary data structures allowing identification of OS version are certain export symbols of the Linux kernel or certain exported symbols of the Windows kernel, such as the NtBuildNumber, among others.

In a step 106, memory introspection engine 40 may call on protection priming module 46 to perform memory-priming operations, in preparation for engine 40 applying integrity protection. In some embodiments, such memory priming operations comprise modifying an allocation of a target object selected for malware protection, so that all pages containing parts of the target object are reserved for the respective target object. In some embodiments, step 106 may include establishing a reserved pool of unallocated memory pages, to be later allocated exclusively to objects selected for malware protection. To establish such a reserved pool, protection priming module 46 may call a native OS memory allocation function to allocate the respective pool to a dummy software object of predetermined size (e.g., 20 MB). Module 46 may thus ensure that the respective pool of memory will be unused in further allocations performed by the native OS memory management functions. The functionality of module 46 is further detailed below, in relation to FIGS. 8-10.

In a step 108, memory introspection engine 40 selects a target object for protection. In some embodiments, step 108 comprises identifying software objects requiring malware protection (see protected area 38 in FIG. 3), according to the type of OS determined in steps 102-104. Exemplary objects targeted for protection are OS driver objects and anti-malware driver 36b, among others. To identify such objects, memory introspection engine 40 may maintain a list of OS-specific objects requiring malware protection; the list may be kept up to date by periodic and/or on-demand software updates. In some embodiments, engine 40 may intercept each attempt by OS 34 to load a driver, and perform a set of integrity and/or signature checks of the respective driver. Such checks may include matching a hash of a part of the respective driver against a library of hashes determined for known drivers, and may allow the identification of anti-malware driver 36b among a plurality of drivers that OS 34 is using and/or is currently attempting to load. Once identified, driver 36b may be protected along with other components of the OS, as shown in more detail below.

A step 110 waits until the target object has been initialized. For instance, when a driver is initialized, OS 34 performs a number of legitimate configuration writes to the memory space allocated to the respective driver or to other software objects selected according to the respective driver or according to a device the respective driver is configured to control; engine 40 may allow such legitimate writes to proceed as part of step 110. To determine whether the target object has been initialized, some embodiments of engine 40 may listen for events and/or processor instructions indicative of driver initialization. Examples of such events include modifications to certain areas of the respective object, among others.

In a step 112, engine 40 protects the respective target object from unwanted modification, for example by malicious software attempting to compromise OS 34. Several such memory protection mechanisms are known in the art. In some embodiments, protecting the target object comprises write-protecting the memory space allocated by OS 34 to the respective target object. Such write-protection may be enforced by hypervisor 30 at the request on memory introspection engine 40, using data structures such as the EPT or NPT. For instance, hypervisor 30 may set the memory pages allocated to the target object as read-only, by modifying the EPT/NPT access right bits of the respective pages. Alternatively, hypervisor 30 may intercept any attempt to write to the memory pages allocated to the target object, and re-direct the respective attempt to memory introspection engine 40 for analysis. After analyzing the write attempt, memory introspection engine 40 may decide whether to allow or to deny (drop) the respective write operation. Steps 108-112 may be repeated for all target objects requiring malware protection.

In some embodiments, memory priming operations performed by protection priming module 46 comprise modifying a memory allocation of a target software object selected for malware protection, said modification occurring prior to engine 40 applying integrity protection of the respective software object, as shown above (FIG. 7, steps 108-112). In some embodiments, module 46 modifies the memory allocation so that memory pages containing parts of the target object are reserved for the respective target object. Modifying said memory allocation may comprise modifying a result of executing a memory management function native to OS 34, and/or modifying the respective memory management function itself. Native memory management functions comprise software objects provided by the manufacturer of OS 34, the native functions performing memory allocation and de-allocation operations. Examples of such functions are KeAllocatePoolWithTag and KeFreePoolWithTag, native to the Windows OS.

In some embodiments, protection priming module 46 identifies a set of native memory management functions according to the OS type determined by introspection engine in step 104, for instance by determining memory addresses where such functions reside in the memory of the respective guest virtual machine 32. To determine such memory addresses, module 46 may access certain data structures, such as the exported functions tables of the kernel binary images (e.g. Portable Executable in Windows, Executable and Linkable Format in Linux).

Following identification of the native memory management functions, some embodiments of module 46 may proceed to modify said functions by providing additional functionality. Such modifications may be achieved using any hooking method known in the art. For instance, module 46 may apply a re-direction patch, such as a VMCall instruction or a JMP instruction, over-written or added to the respective native function. Other embodiments may modify the EPT entry of the respective memory management function, to point to a new address. In some embodiments, the effect of such patches and/or EPT hooks is to redirect execution of the native function to a fragment of code provided by protection priming module 46; exemplary functionality of such code is given below. Following hooking, when OS 34 attempts to allocate memory to or de-allocate memory from a target object, the fragment of code will be executed before or instead of the code of the respective native OS memory management function.

Figure 8:
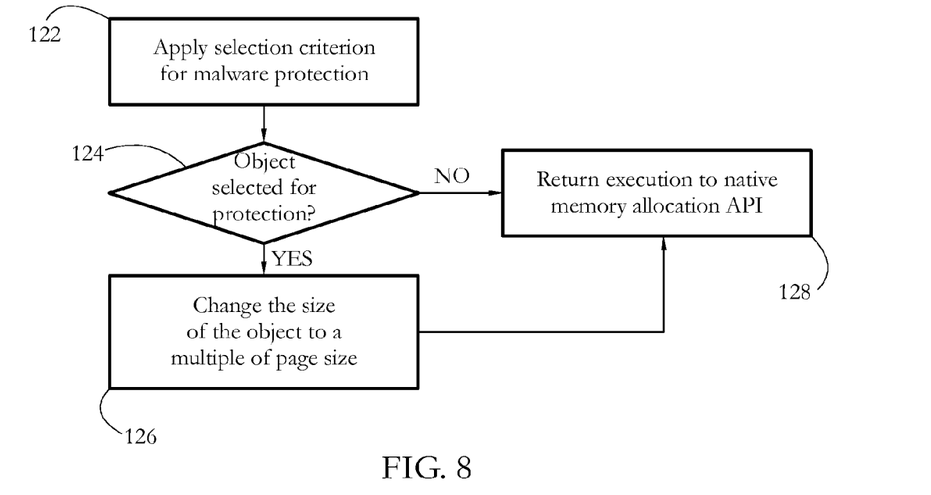
FIG. 8 shows an exemplary sequence of steps performed by an embodiment of the protection priming module to modify the allocation of memory for a target software object.

FIG. 8 shows an exemplary sequence of steps comprising a modification of a native OS memory allocation function, such as KeAllocatePoolWithTag in Windows, according to some embodiments of the present invention. The sequence may form part of protection priming module 46, and may execute as a result of the redirection performed by the patch/hook applied to the respective memory allocation function. A step 122 applies a selection criterion to determine whether the object requesting memory allocation qualifies for malware protection. Such determinations may be carried out, for instance, according to parameters and/or arguments of the respective function call. An exemplary selection criterion comprises selecting objects according to their type, for instance driver objects. In an embodiment running an OS 34 from the Windows family, the type of object being allocated may be determined according to the allocation tag of native memory allocation function KeAllocatePoolWithTag. For instance, a 'Driv' tag indicates a driver object. An alternative selection criterion comprises determining whether the object requesting allocation is on a list of objects targeted for malware protection. Such a list may include members of protected area 38 (FIG. 3). In some embodiments, an additional selection criterion comprises determining whether a memory allocation of the respective object can be safely modified by methods described below.

A step 124 determines whether the target object satisfies the selection criterion for malware protection. If no, a step 128 returns control of execution to the native memory allocation function of the respective OS. When the target object is selected for protection, in a step 126, some embodiments of protection priming module 46 change the size of the target object to a new object size, equal to an integer multiple of the page size. Changing the object size in such manner may effectively force the memory allocator to allocate a set of whole pages to the respective target object, instead of the actual amount of memory required to accommodate the object. In some embodiments, the size of the target object is rounded to the next nearest integer multiple of page size. For instance, a target object of 320 bytes may be allocated a whole 4 kB page, an object of 6 kB may be allocated two whole 4 kB pages, etc. In some embodiments, e.g. a virtual machine executing a Windows OS, allocating a section of memory measuring at least one page in size automatically aligns the allocated section to a page boundary (e.g., section 58 in FIG. 6). In other embodiments, step 126 may include explicitly aligning the allocated section to a page boundary, so that all pages spanned by the section are allocated exclusively to the target object. A person skilled in the art will appreciate that there may be many ways to achieve alignment of the section to a page boundary. For instance, step 126 may include increasing the size of the target object by the size of one page, and changing the pointer to the resulting allocated section of memory. After completing step 126, control of execution is returned to the native OS memory management function.

Figure 9:
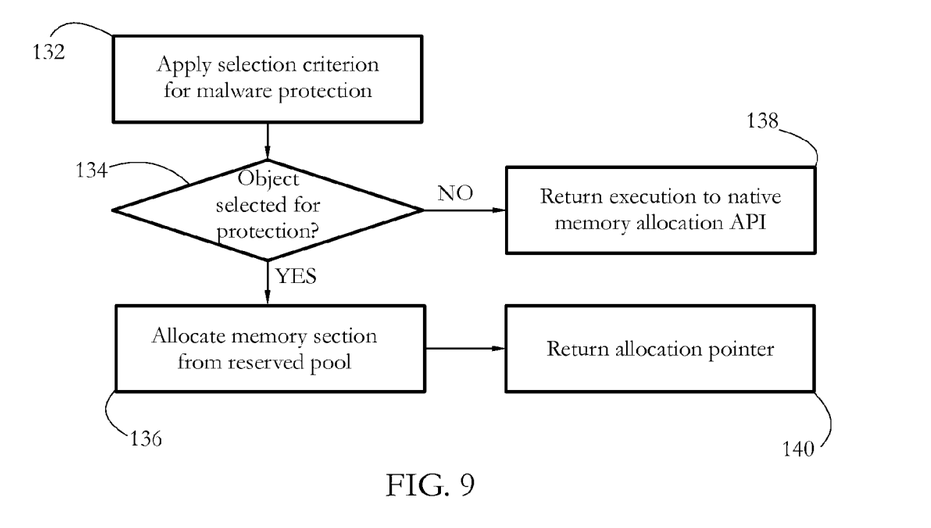
FIG. 9 shows an exemplary sequence of steps performed by another embodiment of the protection priming module to modify the allocation of memory for a target software object.

FIG. 9 shows an exemplary sequence of steps illustrating an alternative manner in which protection priming module 46 may achieve a memory allocation wherein all pages spanned by a section allocated to a protected software object are reserved for the respective object. The sequence shown in FIG. 9 comprises modifying a functionality of a native OS memory allocation function, such as KeAllocatePoolWithTag in Windows, and may execute in response to a patch/hook applied to the respective memory allocation function. A sequence of steps 132-134 verifies whether the target object satisfies a criterion for malware protection; steps 132-134 may proceed in a manner similar to that of steps 122-124 described above. When the target object is not selected for protection, a step 138 returns control of the processor to the respective native memory allocation function. When the target object is selected for malware protection, a step 136 bypasses the native allocation function, and directly allocates a section located within a region of memory reserved for protected objects. In some embodiments, step 136 comprises determining an allocation pointer indicating an address located within a reserved pool of memory established by module 46 upon initialization of OS 34 (see above, in relation to FIG. 7, step 106). In some embodiments, module 46 may further determine the allocation pointer such that the allocated section is aligned to a page boundary. Next, a step 140 returns the allocation pointer determined in step 136.

Figure 10:
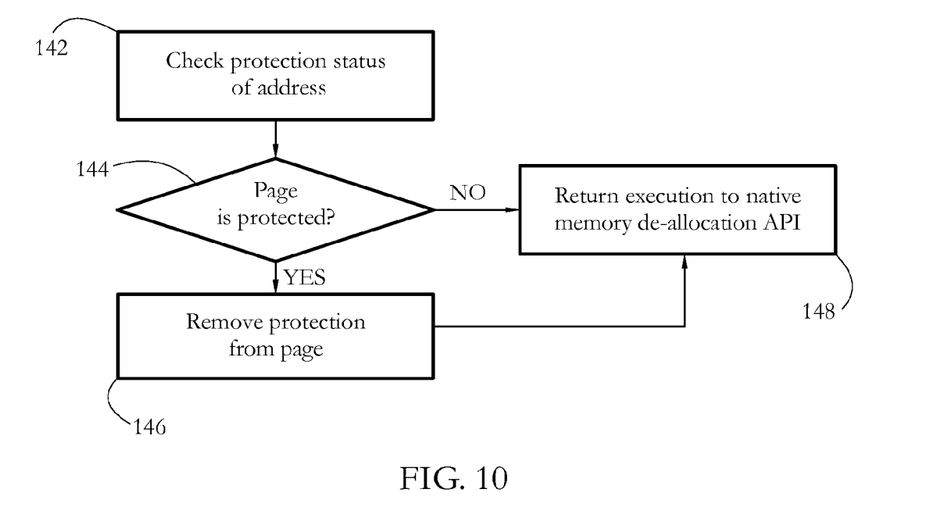
FIG. 10 shows an exemplary sequence of steps performed by the protection priming module to modify a de-allocation of memory for a target software object according to some embodiments of the present invention.

In some embodiments, protection priming module 46 may also modify a de-allocation process, by changing a result of executing a native OS memory de-allocation function, or by modifying the respective function itself. Such modifications may be achieved, for instance, by hooking a native OS memory de-allocation function such as KeFreePoolWithTag, to include additional functionality. FIG. 10 shows an exemplary sequence of steps comprising such a modification of a memory de-allocation function, according to some embodiments of the present invention. A sequence of steps 142-144 determines whether the address of the object being de-allocated is write-protected by introspection engine 40 and/or hypervisor 30 (see above). When the respective address/page does not have such protection, a step 148 returns control of execution to the native OS de-allocation function. When the respective address/page is write-protected by engine 40 and/or hypervisor 30, in a step 146, memory introspection engine 40 and/or a component of hypervisor 30 may remove the protection, before proceeding to step 148. In some embodiments, removing protection from the respective object comprises operating a change in the EPT or NPT, indicating that the page housing the address of the respective object is no longer write-protected, e.g. read-only.

The exemplary systems and methods described above allow protecting a host system, such as a computer system, from malware such as viruses and rootkits. In conventional systems, a rootkit may take control of a computer system by operating at a processor privilege level substantially similar to that of the operating system. In contrast, in some embodiments of the present invention, a hypervisor executes on the computer system at the highest privilege level, displacing the operating system to a virtual machine. In some embodiments, a memory introspection engine executes at the same processor privilege level as the hypervisor. Anti-malware operations may thus be conducted from a processor privilege level higher than that of the operating system. In some embodiments, a single memory introspection engine may protect multiple virtual machines executing concurrently on the respective computer system.

In some embodiments, protecting the respective system from malware comprises selecting a set of critical software objects, such as certain drivers, registers, and page tables, among others, and preventing malicious changes to such objects. To protect a target object, some embodiments may prevent such malicious changes by intercepting an attempt to write to a memory space allocated to the respective object. Such interceptions may be performed from the level of the hypervisor.

Other embodiments may protect a target object by marking the memory space allocated to the respective object as read-only. In typical hardware and software configurations, memory is partitioned into individual blocks of contiguous addresses, known as pages. Access permissions, e.g., read and write permissions, are typically set with page granularity, i.e., all addresses within a page have the same access permissions. Thus, protecting the memory space of a target object may be achieved, for instance, by marking a set of pages containing data belonging to the respective object as read-only. Page-level access permissions are controlled by the hypervisor, for instance using dedicated data structures such as extended page tables (EPT) on Intel platforms.

In conventional systems, when the OS allocates memory space to software objects executing on the respective system, multiple software objects may be allocated within the same page, e.g., when the respective objects have small memory footprints. In some situations, one of the respective objects may be critical to the OS and therefore require protection from malware, while another object from the same page may require frequent and legitimate re-writing. Since access permissions are set with page granularity, protecting the critical object may result in denying write access to all objects residing within the same page as the critical object. Each attempt to write to a memory address residing within a protected page typically results in a fault, followed by a virtual machine exit event transferring control of the processor from the OS of the respective virtual machine to the hypervisor. Such events may comprise loading and/or unloading the state of the respective virtual machine onto or from the processor, further adding to the computational overhead. Even legitimate attempts to write to a page housing, among others, a protected object, may therefore produce a significant slowdown of the computer system.

In contrast, some embodiments of the present invention modify the manner in which memory is allocated to a software object requiring malware protection, so that each memory page containing a part of the respective object is reserved for the respective object. Such modification is performed prior to applying integrity protection to the respective software object. By ensuring that no other object shares a memory page with the target object, some embodiments of the present invention allow for integrity protection with page granularity, while avoiding the computational overhead caused by interception of legitimate write attempts.

In some embodiments, modifying the manner of allocation native to the respective OS comprises identifying the memory allocation and de-allocation functions of the OS, and hooking the respective functions to redirect their execution to a set of instructions executed from the processor privilege level of the hypervisor. Alternatively, said modification redirects the respective functions to a set of instructions executed inside the VM running the respective OS, the set of instructions injected into the memory of the respective VM from the level of the hypervisor. In some embodiments, a memory allocation function is modified to force the allocation of whole memory pages to software objects requiring protection, the allocated section aligned with a page boundary. Thus, an object requiring protection may no longer be allocated to the same memory page as an object not requiring protection.

An alternative embodiment ensures that each page allocated to a target object is reserved for the target object by setting aside a reserved pool of memory, for instance upon OS initialization. When the operating system requests memory allocation for a target object, some embodiments may redirect the allocation pointer to an address within the reserved pool, thus effectively moving the target object to a reserved set of pages.

Conventional anti-malware solutions are typically tailored to a single operating system. Switching between one operating system and another may require loading a different version of anti-malware software. In contrast, in some embodiments of the present invention, the same memory introspection engine may malware-protect the respective computer system, irrespective of the type and version of operating system is currently running. By executing the memory introspection engine at the level of a hypervisor, and by displacing the operating system to a virtual machine, some embodiments may run and protect several operating systems concurrently. In some embodiments, the memory introspection engine may dynamically identify each operating system, for instance on boot-up, and may further protect OS-specific software objects and data structures.

It will be clear to one skilled in the art that the above embodiments may be altered in many ways without departing from the scope of the invention. Accordingly, the scope of the invention should be determined by the following claims and their legal equivalents.

What is claimed is:

1. A host system comprising at least one processor configured to execute:
   an operating system configured to allocate a section of a virtualized physical memory of a virtual machine to a target software object executing within the virtual machine, the virtual machine exposed by a hypervisor executing on the host system, wherein the virtualized physical memory is partitioned into pages, a page being the smallest unit of memory individually mapped between the virtualized physical memory and a physical memory of the host system; and
   a protection priming module configured, in response to a determination of whether the target software object satisfies a selection criterion for malware protection, when the target software object satisfies the selection criterion, to change a memory allocation of the target object, wherein changing the memory allocation comprises ensuring that any page containing at least part of the target software object is reserved for the target software object.

2. The host system of claim 1, further comprising a memory introspection engine connected to the protection priming module, the memory introspection engine configured, in response to the protection priming module changing the memory allocation, to write-protect all pages containing at least part of the target software object.

3. The host system of claim 2, wherein the memory introspection engine is further configured to:
   determine whether the target software object has been initialized, and
   in response, when the target software object has been initialized, write-protect all pages containing at least part of the target software object.

4. The host system of claim 1, wherein the selection criterion comprises selecting the target software object according to a type of the operating system.

5. The host system of claim 4, wherein the determination of whether the target software object satisfies the selection criterion for malware protection comprises identifying the type of the operating system according to a content of a model specific register (MSR) of the virtual machine.

6. The host system of claim 4, wherein the determination of whether the target software object satisfies the selection criterion for malware protection comprises identifying the type of the operating system according to a content of memory pointed to by a model specific register (MSR) of the virtual machine.

7. The host system of claim 1, wherein changing the memory allocation comprises hooking a memory allocation function of the operating system.

8. The host system of claim 1, wherein changing the memory allocation comprises instructing a memory allocation function of the operating system to allocate any page containing at least part of the target software object exclusively to the target software object.

9. The host system of claim 8, wherein instructing the memory allocation function comprises changing a size of the target software object to an integer multiple of page size.

10. The host system of claim 9, wherein instructing the memory allocation function further comprises aligning the section to a page boundary.

11. The host system of claim 1, wherein the protection priming module is further configured to establish a reserved pool of pages, the pool reserved for allocation to malware-protected software objects, and wherein changing the memory allocation comprises allocating the section within the reserved pool of memory pages.

12. The host system of claim 1, wherein the determination of whether the target software object satisfies the selection criterion for malware protection comprises:
    determining whether the target software object is a driver object; and
    in response, when the target software object is a driver object, determining that the target software object satisfies the selection criterion for malware protection.

13. The host system of claim 1, wherein the protection priming module is further configured to change a de-allocation of the target object, wherein changing the de-allocation comprises:
    determining whether a page containing at least part of the target software object is write-protected, and
    in response, when the page is write-protected, removing the write protection from the page.

14. The host system of claim 12, wherein changing the de-allocation further comprises hooking a memory de-allocation function of the operating system.

15. A method comprising:
    employing at least one processor of a host system to form an operating system configured to allocate a section of a virtualized physical memory of a virtual machine to a target software object executing within the virtual machine, the virtual machine exposed by a hypervisor executing on the host system, wherein the virtualized physical memory is partitioned into pages, a page being the smallest unit of memory individually mapped between the virtualized physical memory and a physical memory of the host system; and
    in response to a determination of whether the target software object satisfies a selection criterion for malware protection, when the target software object satisfies the selection criterion, employing the at least one processor to change a memory allocation of the target software object, wherein changing the memory allocation comprises ensuring that any page containing at least part of the target software object is reserved for the target software object.

16. The method of claim 15, further comprising, in response to changing the memory allocation, write-protecting all pages containing at least part of the target software object.

17. The method of claim 16, further comprising:
    determining whether the target software object has been initialized, and
    in response, when the target software object has been initialized, write-protecting all pages containing at least part of the target software object.

18. The method of claim 15, wherein the selection criterion comprises selecting the target software object according to a type of the operating system.

19. The method of claim 18, wherein the determination of whether the target software object satisfies the selection criterion for malware protection comprises identifying the type of the operating system according to a content of a model specific register (MSR) of the virtual machine.

20. The method of claim 18, wherein the determination of whether the target software object satisfies the selection criterion for malware protection comprises identifying the type of the operating system according to a content of memory pointed to by a model specific register (MSR) of the virtual machine.

21. The method of claim 15, wherein changing the memory allocation comprises hooking a memory allocation function of the operating system.

22. The method of claim 21, wherein changing the memory allocation comprises instructing a memory allocation function of the operating system to allocate all pages containing at least part of the target software object exclusively to the target software object.

23. The method of claim 22, wherein instructing the memory allocation function comprises changing a size of the target software object to an integer multiple of page size.

24. The method of claim 23, wherein instructing the memory allocation function further comprises aligning the section to a page boundary.

25. The method of claim 15, wherein changing the memory allocation comprises:
    establishing a reserved pool of pages, the pool reserved for allocation to malware-protected software objects, and
    allocating the section within the reserved pool of memory pages.

26. The method of claim 15, wherein the determination of whether the target software object satisfies the selection criterion for malware protection comprises:
    determining whether the target software object is a driver object; and
    in response, when the target software object is a driver object, determining that the target software object satisfies the selection criterion for malware protection.

27. The method of claim 15, further comprising employing the at least one processor to change a de-allocation of the target software object, wherein changing the de-allocation comprises:
    determining whether a page containing at least part of the software object is write-protected, and
    in response, when the page is write-protected, removing the write protection from the page.

28. The method of claim 27, wherein changing the de-allocation further comprises hooking a memory de-allocation function of the operating system.

29. A non-transitory computer-readable medium encoding instructions which, when executed by at least one processor of a host system, cause the at least one processor to:
- allocate a section of a virtualized physical memory of a virtual machine to a target software object executing within the virtual machine, the virtual machine exposed by a hypervisor executing on the host system, wherein the virtualized physical memory is partitioned into pages, a page being the smallest unit of memory individually mapped between the virtualized physical memory and a physical memory of the host system; and
- in response to a determination of whether the target software object satisfies a selection criterion for malware protection, when the target software object satisfies the selection criterion, change a memory allocation of the target software object, wherein changing the memory allocation comprises ensuring that any page containing at least part of the target software object is reserved for the target software object.

\* \* \* \* \*